(12) United States Patent
Nallaperumal et al.

(10) Patent No.: US 12,489,673 B2
(45) Date of Patent: Dec. 2, 2025

(54) SYSTEM AND METHOD FOR COMMISSIONING SAFETY DEVICES

(71) Applicant: Carrier Corporation, Palm Beach Gardens, FL (US)

(72) Inventors: Pirammanayagam Nallaperumal, Hyderabad (IN); Saikrishna Gajula, Hyderabad (IN); Ashis Kumar Sinha, Chandanagar (IN); Ramakrishna Pulluru, Hyderabad (IN); Rizwana Begum, Hyderabad (IN)

(73) Assignee: KIDDE FIRE PROTECTION, LLC, Bradenton, FL (US)

( * ) Notice: Subject to any disclaimer, the term of this patent is extended or adjusted under 35 U.S.C. 154(b) by 0 days.

(21) Appl. No.: 18/423,430

(22) Filed: Jan. 26, 2024

(65) Prior Publication Data
US 2024/0259262 A1  Aug. 1, 2024

Related U.S. Application Data

(60) Provisional application No. 63/481,717, filed on Jan. 26, 2023.

(51) Int. Cl.
*G06F 13/00* (2006.01)
*H04L 41/08* (2022.01)
*H04L 41/0806* (2022.01)

(52) U.S. Cl.
CPC ...... *H04L 41/0806* (2013.01); *H04L 41/0889* (2013.01)

(58) Field of Classification Search
CPC . H04L 41/0806; H04L 41/0889; G08B 29/18; G08B 25/007; G08B 25/003; G08B 29/06; G08B 29/08
(Continued)

(56) References Cited

U.S. PATENT DOCUMENTS

| 7,580,701 B2 | 8/2009 | Ross et al. |
| 7,609,837 B2 | 10/2009 | Bennett |

(Continued)

FOREIGN PATENT DOCUMENTS

EP  3839911 A1  6/2021

OTHER PUBLICATIONS

European Search Report for Application No. 24154226.5, Issued May 23, 2024, 9 Pages.

*Primary Examiner* — Kenneth R Coulter
(74) *Attorney, Agent, or Firm* — CANTOR COLBURN LLP (57) ABSTRACT

A system and method for commissioning safety devices is disclosed. The method includes providing one or more safety devices configured to generate a signal responsive to detection of a hazard. The one or more safety devices are communicably coupled to each other via first and second communication networks. The method further includes receiving, by a controller, at any one of the one or more safety devices, a first data packet including attributes pertaining to commissioning of the one safety device. The method further includes transmitting, by the controller, the first data packet to the remaining safety devices of the one or more safety devices through the first communication network. The method further includes receiving, by the remaining safety devices of the one or more safety devices, the first data packet to enable respective commissioning of the remaining safety devices.

18 Claims, 4 Drawing Sheets

(58) Field of Classification Search
USPC .................. 709/222, 249, 251, 250
See application file for complete search history.

(56) References Cited

U.S. PATENT DOCUMENTS

| | | | |
|---|---|---|---|
| 8,270,934 B2 | 9/2012 | Manchester et al. |
| 8,559,349 B2 | 10/2013 | Hurwitz et al. |
| 8,599,757 B2 | 12/2013 | Huang |
| 8,925,042 B2 | 12/2014 | Drovdahl et al. |
| 9,392,675 B2 | 7/2016 | Taipale et al. |
| 9,459,604 B2 | 10/2016 | Krutsch et al. |
| 9,515,875 B2 | 12/2016 | Baugher et al. |
| 9,591,690 B2 | 3/2017 | Mathews et al. |
| 9,603,012 B2 | 3/2017 | Kruglick |
| 9,747,782 B2 | 8/2017 | Cutler |
| 9,806,900 B2 | 10/2017 | Jacobson et al. |
| 9,838,390 B2 | 12/2017 | Zakaria |
| 9,905,115 B2 | 2/2018 | Venkatesh et al. |
| 9,906,956 B1 | 2/2018 | Huang |
| 10,047,971 B2 | 8/2018 | Nyamjav et al. |
| 10,116,501 B2 | 10/2018 | Erdmann et al. |
| 10,142,122 B1 * | 11/2018 | Hill ............... H04L 12/2807 |
| 10,154,025 B2 | 12/2018 | Tinnakornsrisuphap et al. |
| 10,257,686 B2 | 4/2019 | Logue et al. |
| 10,575,159 B2 | 2/2020 | Wang et al. |
| 10,601,603 B1 | 3/2020 | Vijayakumari Mahasenan et al. |
| 11,055,615 B2 | 7/2021 | Litichever et al. |
| 11,244,554 B1 | 2/2022 | Volodymyrovych et al. |
| 11,469,941 B2 * | 10/2022 | Hiller ............... H04W 8/183 |
| 2006/0018328 A1 | 1/2006 | Mody et al. |
| 2016/0344449 A1 | 11/2016 | Tzou |
| 2017/0339653 A1 | 11/2017 | Hui et al. |
| 2019/0051139 A1 | 2/2019 | Nalukurthy et al. |
| 2019/0116087 A1 * | 4/2019 | Hiller ............... H04W 4/70 |

* cited by examiner

SYSTEM AND METHOD FOR COMMISSIONING SAFETY DEVICES

CROSS-REFERENCE TO RELATED APPLICATION

This patent application claims the benefit of U.S. Provisional Patent Application No. 63/481,717, filed on Jan. 26, 2023, which is incorporated by reference herein in its entirety.

TECHNICAL FIELD

This invention relates to fire safety devices, and more particularly, to commissioning a plurality of fire safety devices.

BACKGROUND

A plurality of safety devices is typically deployed in a structure, such as a commercial, industrial, or residential building to assist in early detection of fire hazards. The safety devices may be any, such as smoke detectors, temperature detectors, or a combination thereof. Each of the plurality of safety devices are typically communicably coupled to each other so that detection of a fire hazard by any one of the safety devices may be communicated to the other safety devices quickly. Conventionally, the safety devices are communicably coupled to each other via hardwired communication networks. With the advent of wireless communication networks, safety devices are now equipped to be communicably coupled to each other via wireless communication networks, such as Wi-Fi, Bluetooth low energy (BLE) networks, etc. The wireless communication capability may allow for better collection of data, and may enable faster responses from assistance services, such as emergency services. However, in order to communicably couple the plurality of safety devices via wireless communication networks, the safety devices have to be individually commissioned. In other words, each safety device may be required to be separately communicably coupled to the wireless communication network. In instances where there are several safety devices disposed in a structure, such as a building, the activity of individually commissioning each safety device may be long and cumbersome.

SUMMARY

Disclosed herein is a method for commissioning safety devices. The method includes providing one or more safety devices configured to generate a signal responsive to detection of a hazard. The one or more safety devices are communicably coupled to each other via first and second communication networks. The method further includes receiving, by a controller, at any one of the one or more safety devices, a first data packet including attributes pertaining to commissioning of the one safety device. The commissioning of the one safety device is indicative of a positive coupling of the one safety device with any one or both of the first and second communication networks. The method further includes transmitting, by the controller, the first data packet to the remaining safety devices of the one or more safety devices through the first communication network. The method further includes receiving, by the remaining safety devices of the one or more safety devices, the first data packet to enable respective commissioning of the remaining safety devices.

In one or more embodiments, the first communication network is a hardwired communication network.

In one or more embodiments, the second communication network is a wireless communication network.

In one or more embodiments, the first data packet includes authentication data pertaining to the respective one safety device. The authentication data is indicative of a compatibility of the one safety device with any of the first and second communication networks. The method further includes commissioning, by the controller, the one safety device responsive to receipt of a positive authentication of the one safety device.

In one or more embodiments, the first data packet includes network configuration data pertaining to the second communication network.

In one or more embodiments, the first data packet is received, by the controller, from an electronic device associated with a user.

In one or more embodiments, the method further includes generating, by the controller, a second data packet including a log of operations for each of the one or more safety devices. The method further includes transmitting, by the controller, the second data packet to an external storage device communicably coupled to the controller, via the second communication network.

In one or more embodiments, the log of operations for each of the safety devices includes any one or a combination of an identity, a state of charge of a battery, a log of detection of fire hazards of the respective safety device.

In one or more embodiments, the second data packets are configured to be generated, by the controller, at predefined instances of time.

In one or more embodiments, the method further includes providing an electronic device communicably coupled to the controller. The electronic device includes an interface configured for exchange of data between the controller and a user of the electronic device.

Further disclosed herein is a system for commissioning safety devices. The system includes one or more safety devices configured to generate a signal responsive to detection of a hazard. The one or more safety devices are communicably coupled to each other via first and second communication networks. The system further includes a controller communicably coupled to the one or more safety devices. The controller includes a processor and a memory communicably coupled to the processor. The controller is configured to receive, at any one of the one or more safety devices, a first data packet including attributes pertaining to commissioning of the one safety device. The commissioning of the one safety device is indicative of a positive coupling of the one safety device with any one or both of the first and second communication networks. The controller is further configured to transmit, the first data packet to the remaining safety devices of the one or more safety devices through the first communication network. The remaining safety devices of the one or more safety devices receive the first data packet to enable respective commissioning of the remaining safety devices.

In one or more embodiments, the first communication network is a hardwired communication network.

In one or more embodiments, the second communication network is a wireless communication network.

In one or more embodiments, the first data packet includes authentication data pertaining to the respective one safety device. The authentication data is indicative of a compatibility of the one safety device with any of the first and second communication networks. The controller is further configured to commission the one safety device responsive to receipt of a positive authentication of the one safety device.

In one or more embodiments, the first data packet includes network configuration data pertaining to the second communication network.

In one or more embodiments, the first data packet is received, by the controller, from an electronic device associated with a user.

In one or more embodiments, the controller is further configured to generate a second data packet including a log of operations for each of the one or more safety devices. The controller is further configured to transmit the second data packet to an external storage device communicably coupled to the controller, via the second communication network.

In one or more embodiments, the log of operations for each of the safety devices includes any one or a combination of an identity, a state of charge of a battery, a log of detection of fire hazards of the respective safety device.

In one or more embodiments, the controller is configured to generate the second data packets at predefined instances of time.

In one or more embodiments, the system further includes an electronic device communicably coupled to the controller. The electronic device includes an interface configured for exchange of data between the controller and a user of the electronic device.

The foregoing summary is illustrative only and is not intended to be in any way limiting. In addition to the illustrative aspects, embodiments, and features described above, further aspects, embodiments, features, and techniques of the invention will become more apparent from the following description taken in conjunction with the drawings.

BRIEF DESCRIPTION OF THE DRAWINGS

The accompanying drawings are included to provide a further understanding of the subject disclosure of this invention and are incorporated in and constitute a part of this specification. The drawings illustrate exemplary embodiments of the subject disclosure and, together with the description, serve to explain the principles of the subject disclosure.

In the drawings, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

The following is a detailed description of embodiments of the disclosure depicted in the accompanying drawings. The embodiments are in such detail as to clearly communicate the disclosure. However, the amount of detail offered is not intended to limit the anticipated variations of embodiments; on the contrary, the intention is to cover all modifications, equivalents, and alternatives falling within the spirit and scope of the subject disclosure as defined by the appended claims.

Various terms are used herein. To the extent a term used in a claim is not defined below, it should be given the broadest definition persons in the pertinent art have given that term as reflected in printed publications and issued patents at the time of filing.

In the specification, reference may be made to the spatial relationships between various components and to the spatial orientation of various aspects of components as the devices are depicted in the attached drawings. However, as will be recognized by those skilled in the art after a complete reading of the subject disclosure, the components of this invention. described herein may be positioned in any desired orientation. Thus, the use of terms such as "above," "below," "upper," "lower," "first", "second" or other like terms to describe a spatial relationship between various components or to describe the spatial orientation of aspects of such components should be understood to describe a relative relationship between the components or a spatial orientation of aspects of such components.

Figure 1:
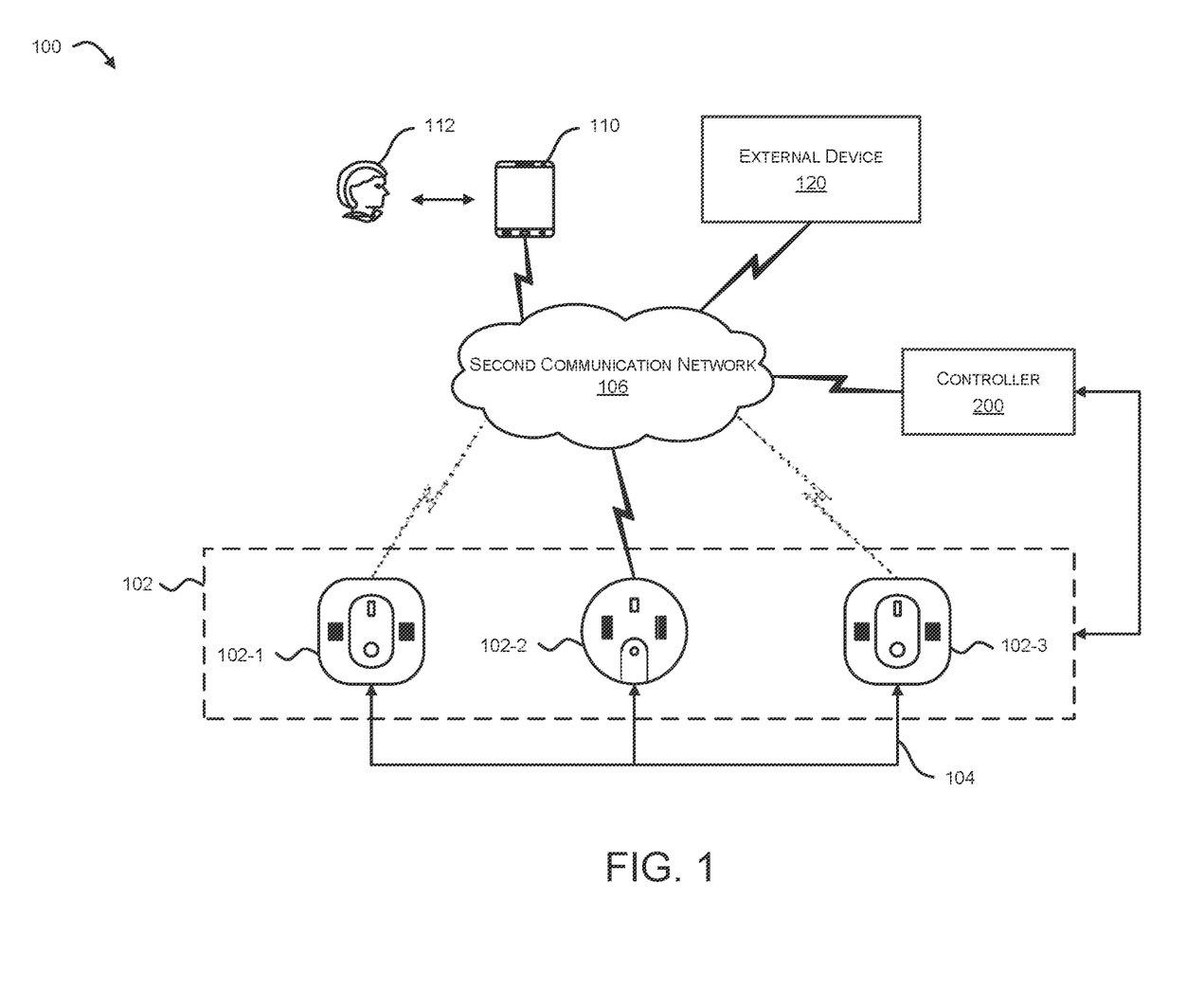
FIG. 1 is a schematic representation of a system for commissioning safety devices, in accordance with one or more embodiments of the invention.

Referring to FIG. 1, a schematic representation of a system 100 for commissioning safety devices 102 is shown. In the illustrated embodiment, safety devices 102 refer to fire alarms. The safety devices 102 are configured to generate a signal responsive to detection of a fire hazard. The fire hazard may be detected as an increase in temperature in a vicinity of the safety device 102, or as smoke detected by the safety device 102, or as combinations thereof. The safety devices 102 may be disposed in different regions within a structure. For example, the safety devices 102 may be distributed between rooms in a commercial office, or a residential dwelling. In another example, the safety devices 102 may be distributed in an industrial area. FIG. 1 illustrates three safety devices 102-1, 102-2, 102-3 (collectively designated 102). The safety devices 102-1 to 102-3 may be disposed within a household, in three different rooms, for instance. The safety devices 102 may be communicably coupled to each other, such that, responsive to detection of fire hazard by any one of the safety devices, the remaining safety devices are also in receipt of the information. The safety devices may together, generate an alert, indicating that any residents may evacuate the premises, or that countermeasures may be required to be taken.

The safety devices are communicably coupled to one another through a first communication network 104. The first communication network 104 may be a hardwired communication network. The hardwired communication network may be an optic cable, or a metallic cable provided in the structure of the building in which the safety devices 102 are disposed. The first communication network 104 may be configured to transmit low amounts of data. Specifically, the first communication network 104 may be configured to transmit the signal generated responsive to detection of the fire hazard. When any one of the safety devices (for e.g., safety device 102-2) detects a fire hazard, and generates the signal, the signal may be received by, and transmitted through the first communication network 104 to the remaining safety devices (safety devices 102-1, 102-3).

The safety devices 102 may be plug-and-play devices. In other words, the safety devices 102 may only be required to be plugged into a suitable adapted or connecter provided, in order for the safety devices 102 to be communicably coupled to each other via the first communication network 104. The connectors may further be provided with electrical connections adapted to supply the safety devices 102 with electrical power required for the operation of the safety devices 102.

In some cases, the safety devices 102 may further be communicably coupled to one another via a second communication network 106. The second communication network 106 may be a wireless network. The wireless communication network may be any wireless communication network capable of transferring data between entities of that network such as, but are not limited to, a carrier network including circuit switched network, a public switched network, a Content Delivery Network (CDN) network, a Long-Term Evolution (LTE) network, a Global System for Mobile Communications (GSM) network and a Universal Mobile Telecommunications System (UMTS) network, an Internet, intranets, local area networks, wide area networks, mobile communication networks, Bluetooth low energy (BLE) networks, combinations thereof, and the like. Through the second communication network 106, the safety devices 102 may be configured to issue alerts to remote servers, or electronic devices, thereby facilitating faster response entities, such as emergency services.

In order to initialize or commission the safety devices 102 with the second communications network 106, it may be required to provide network configuration details, authentication details etc. For example, when the second communication network 106 is a Wi-Fi network, details, such as router credentials may be required. In another example, when the second communication network 106 is a Zigbee network, details, such as MAC address and PAN identification may be required. In another example, when the second communication network 106 is a SubGHz network, details, such as a serial number and network identification may be required. In cases when a plurality of safety devices is provided, it may be required to commission each of the safety devices separately, leading to a cumbersome commissioning process.

The system 100 further includes a controller 200 configured to commission one or more safety devices 102. The controller 200 is communicably coupled to the one or more safety devices 200. The controller 200 may be implemented by way of a single device or a combination of multiple devices that may be communicably coupled or networked together. In one instance, the controller 200 may be implemented by way of standalone device and may be communicably coupled to the safety devices 102. In another instance, the controller 200 may be implemented in any one or more of the safety devices 102. The controller 200 may be implemented in hardware or a suitable combination of hardware and software.

The controller 200 may be a hardware device including a processor executing machine-readable program instructions. The "hardware" may include a combination of discrete components, an integrated circuit, an application-specific integrated circuit, a field programmable gate array, a digital signal processor, or other suitable hardware. The "software" may comprise one or more objects, agents, threads, lines of code, subroutines, separate software applications, two or more lines of code or other suitable software structures operating in one or more software applications or on one or more processors. The processor may include, for example, without limitations, microprocessors, microcomputers, microcontrollers, digital signal processors, central processing units, state machines, logic circuits, any devices that manipulate data or signals based on operational instructions, and the like. Among other capabilities, the processor may fetch and execute computer-readable instructions in the memory operationally coupled with the controller 200 for performing tasks such as data processing, input/output processing, feature extraction, and/or any other functions. Any reference to a task in the present disclosure may refer to an operation being or that may be performed on data.

The system 100 may further include one or more electronic devices, such as an electronic device 110. The electronic devices 110 may be associated with a user 112. The electronic device 110 may be communicably coupled to the components of the system 100 through the second communication network 106. The electronic devices 110 may be used to provide input to any one or more of the components of the system 100. In some instances, the electronic device 110 may include audio-visual devices, such as display screens, LED lighting displays, speakers, etc. The electronic device 110 may be any electrical, electronic, electromechanical, or computing device. The electronic device 110 may include, without limitations, a mobile device, a smart phone, a Personal Digital Assistant (PDA), a tablet computer, a phablet computer, a wearable device, a Virtual Reality/Augment Reality (VR/AR) device, a laptop, a desktop, and the like. The electronic device 110 may be configured to execute a set of instructions to generate an interface to exchange data with other components of the system 100. The set of instructions may result in opening of an application or a software. In some cases, executing the set of instruction may result in opening of an application hosted on an external server, such as a website.

The system 100 further includes an external storage device 120 communicably coupled to the controller 200 via the second communication network 106. The external storage device 120 may be a remote server, or a cloud-based storage unit.

Further, the system 100 may also include other units such as a display unit, an input unit, an output unit and the like; however, the same are not shown in the FIG. 1, for the purpose of clarity. Also, in FIG. 1, only few units are shown; however, the controller 200 may include multiple such units or the controller 200 may include any such numbers of the units, obvious to a person skilled in the art or as required to implement the features of the present invention.

Figure 2:
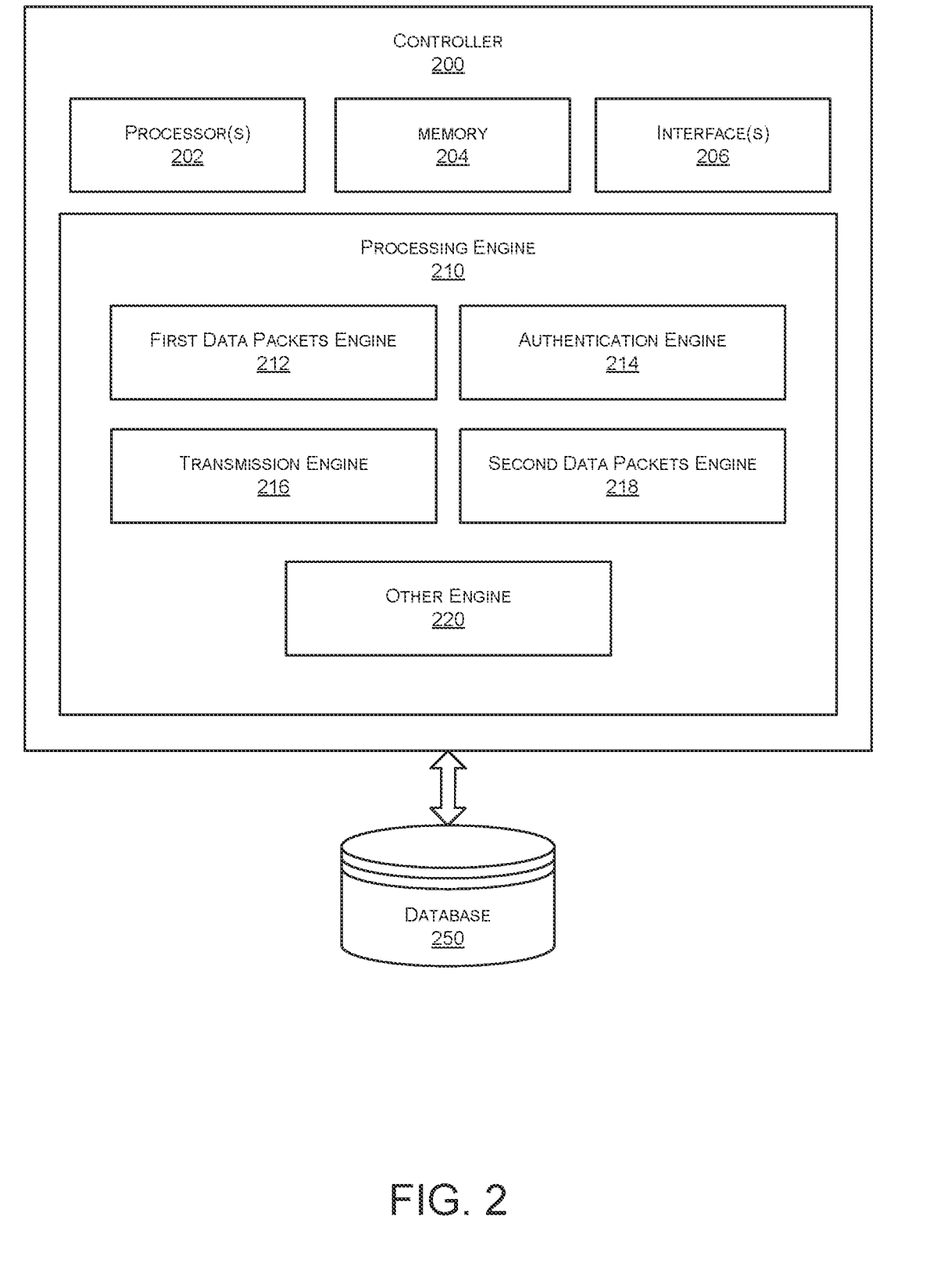
FIG. 2 is a detailed schematic block diagram of a controller of the system of FIG. 1, in accordance with one or more embodiments of the invention.

Referring to FIG. 2, a detailed schematic block diagram of the controller 200 of the system 100 is shown. The controller 200 includes a processor 202, and a memory 204 communicably coupled to the processor 202. The memory 204 may store instructions executable by the processor 202 to implement the controller 200. The controller 200 further includes an interface 206. The interface 206 may include a variety of interfaces, for example, interfaces for data input and output devices, referred to as I/O devices, storage devices, and the like. The interface 206 may also provide a communication pathway for one or more components of the controller 200. The controller 200 further includes a database 250 communicably coupled to the controller 200. The database 250 may be configured to store data generated during execution of instructions by the processor 202 in order to implement the controller 200. The data may include, without limitations, a log of operations of each of the safety devices 102.

Referring now to FIGS. 1 and 2, in some embodiments, the controller 200 includes a processing engine 210. The processing engine 210 may be implemented as a combination of hardware and programming (for example, programmable instructions) to implement one or more functionalities of the processing engine 210. In some examples, the processing engine 210 may be implemented by electronic circuitry.

The processing engine 210 may include a first data packet engine 212, an authentication engine 214, a transmission engine 216, a second data packet engine 218, and other engine(s) 220. The other engine(s) 220 may include engines configured to perform one or more functions ancillary functions associated with the processing engine 210.

The first data packet engine 212 is configured to receive, at any one of the one or more safety devices 102, a first data packet including attributes pertaining to commissioning of the safety device 102. The commissioning of the safety device 102 is indicative of a positive coupling of the safety device 102 with any one or both of the first and second communication networks 104, 106. In some embodiments, the first data packet includes network configuration data pertaining to the second communication network 106. In some embodiments, the first data packets may be received, by the first data packet engine 212, from the electronic device 110 associated with the user 112. In some embodiments, the first data packet may include network configuration data, such as, without limitations, Wi-Fi router credentials, MAC address etc.

The authentication engine 214 is configured to authenticate the one or more safety devices 102. The first data packet may further include authentication data pertaining to the respective safety device 102. The authentication data is indicative of a compatibility of the safety device 102 with any of the first and second communication networks 104, 106. The controller 200 is configured to commission the safety device 102 responsive to receipt of a positive authentication of the safety device 102.

In some cases, some safety devices may not be compatible with either the first or the second communication networks 104, 106. In such cases, coupling the safety device 102 may lead to potential mis-operation of the safety device 102. Hence, the authentication engine 214 may be configured to determine if the safety device 102 to be commissioned in authenticated. In the event of an error, the authentication engine 214 may be configured to generate an alert indicating that the safety device 102 is not authenticated and may not be commissioned.

The transmission engine 216 is configured to transmit the first data packet to the remaining safety devices 102 via the first communication network 104. Hence, though only one of the safety devices 102 receives the first data packet including the network configuration details, the details are transmitted to all the remaining safety devices through the hardwired communication network, thus enabling the remaining safety devices 102 to be commissioned without a need for individually entering the details at each of the safety devices 102.

For example, in the case of three safety devices to be commissioned, if the device 102-2 has received the input required for coupling the safety device 102-2 to the first and second communication networks 104, 106, the controller 200 is configured to effect transmission of the network configurations to the safety devices 102-1, 102-3 via the first communication network 104 in order that the safety devices 102-1, 102-3 are able to be commissioned using the same network configurations as the safety device 102-2.

The second data packet engine 218 is configured to generate a second data packet including a log of operations of each of the safety devices 102. The second data packet engine 218 is further configured to transmit the second data packet to the external storage device 120 via the second communication network 106. In some embodiments, the log of operations includes any one or a combination of an identity, a state of charge of a battery, a log of detection of fire hazards of the respective safety device 102. In some embodiments, the second data packet engine 218 is configured to generate the second data packet at predefined instances of time. For example, the second data packet engine 218 may generate the second data packet every hour, or every 12 hours, or every 24 hours, or during a set time every day, etc.

Figure 3:
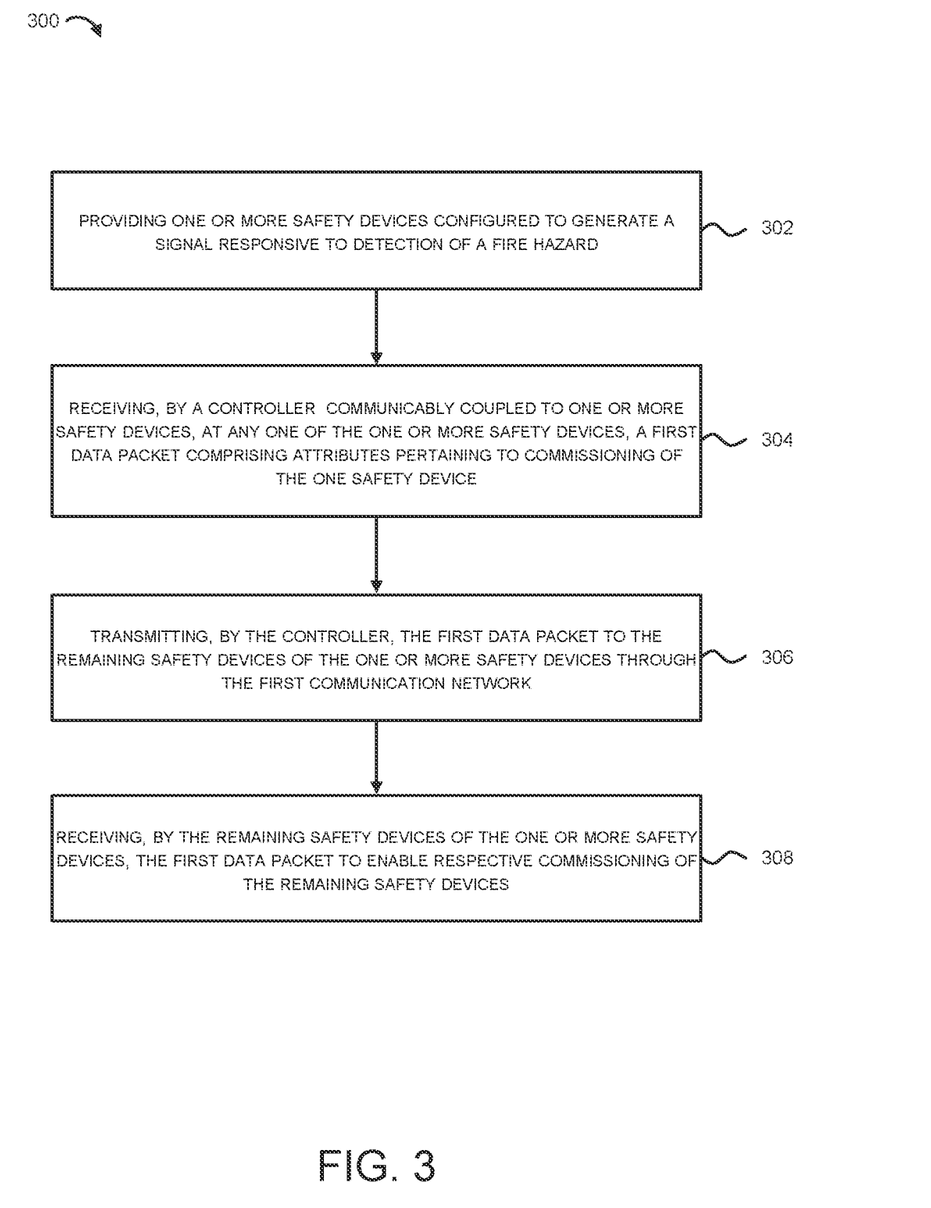
FIG. 3 is a schematic flow diagram for a method for commissioning safety devices, in accordance with one or more embodiments of the invention.

Referring to FIG. 3, a schematic flow diagram for a method 300 for commissioning safety devices 102 is shown. Referring now to FIGS. 1 to 3, at step 302, the method 300 includes providing the one or more safety devices 102 configured to generate a signal responsive to detection of a fire hazard. At step 304, the method 300 further includes receiving, by the controller 200, at any one of the one or more safety devices 102, the first data packet including attributes pertaining to commissioning of the safety device 102. At step 306, the method 300 further includes transmitting, by the controller 200, the first data packet to the remaining safety devices 102 of the one or more safety devices 102 through the first communication network 104. At step 308, the method 300 further includes receiving, by the remaining safety devices 102 of the one or more safety devices 102, the first data packet to enable respective commissioning of the remaining safety devices 102.

In some embodiments, the method 300 further includes generating, by the controller 200, the second data packet including the log of operations for each of the one or more safety devices 102. The method 300 further includes transmitting, by the controller 200, the second data packet to the external storage device 120 communicably coupled to the controller 200, via the second communication network 106.

Figure 4:
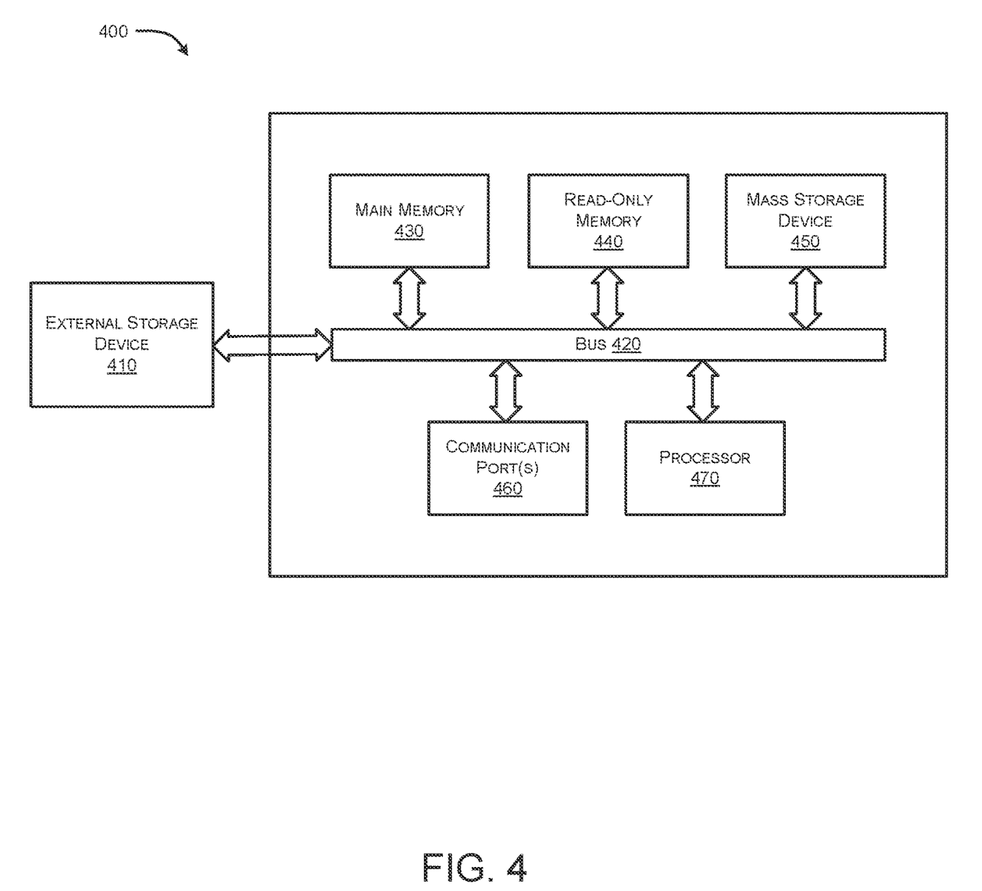
FIG. 4 is an exemplary schematic block diagram of a hardware system used for implementing the controller of FIG. 2.

FIG. 4 is an exemplary schematic block diagram of a hardware system used for implementing the controller 200. As shown in FIG. 4, a computer system 400 can include an external storage device 410, a bus 420, a main memory 430, a read only memory 440, a mass storage device 450, communication port 460, and a processor 470. A person skilled in the art will appreciate that the computer system may include more than one processor and communication ports. Examples of processor 470 include, but are not limited to, an Intel® Itanium® or Itanium 2 processor(s), or AMD® Opteron® or Athlon MP® processor(s), Motorola® lines of processors, FortiSOC™ system on chip processors or other future processors. Processor 470 may include various modules. Communication port 460 can be any of an RS-232 port for use with a modem-based dialup connection, a 10/100 Ethernet port, a Gigabit or 10 Gigabit port using copper or fibre, a serial port, a parallel port, or other existing or future ports. Communication port 460 may be chosen depending on a network, such a Local Area Network (LAN), Wide Area Network (WAN), or any network to which computer system connects. Memory 430 can be Random Access Memory (RAM), or any other dynamic storage device commonly known in the art. Read-only memory 440 can be any static storage device(s) e.g., but not limited to, a Programmable Read Only Memory (PROM) chips for storing static information e.g., start-up or BIOS instructions for processor 470. Mass storage 450 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

Bus 420 communicatively couples processor(s) 470 with the other memory, storage, and communication blocks. Bus 420 can be, e.g., a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 470 to software system.

Optionally, operator and administrative interfaces, e.g., a display, keyboard, and a cursor control device, may also be coupled to bus 420 to support direct operator interaction with a computer system. Other operator and administrative interfaces can be provided through network connections connected through communication port 460. The external storage device 410 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present disclosure.

While the invention has been described with reference to exemplary embodiments, it will be understood by those skilled in the art that various changes may be made and equivalents may be substituted for elements thereof without departing from the scope of the invention as defined by the appended claims. Modifications may be made to adopt a particular situation or material to the teachings of the invention without departing from the scope thereof. Therefore, it is intended that the invention not be limited to the particular embodiment disclosed, but that the invention includes all embodiments falling within the scope of the invention as defined by the appended claims.

In interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

The invention claimed is:

1. A method for commissioning safety devices, the method comprising:
   providing a first safety device and a second safety device, each configured to generate a signal responsive to detection of a hazard, wherein the first and second safety devices are communicably coupled to each other via first and second communication networks;
   receiving, by a controller at the first safety device, a first data packet comprising attributes pertaining to commissioning of the first safety device, wherein the commissioning of the first safety device is indicative of a positive coupling of the first safety device with one or both of the first and second communication networks;
   transmitting, by the controller, the first data packet to the second safety device through the first communication network; and
   receiving, by the second safety device, the first data packet to enable respective commissioning of the second safety device;
   generating, by the controller, a second data packet comprising a log of operations for the first and second safety devices; and
   transmitting, by the controller, the second data packet to an external storage device communicably coupled to the controller, via the second communication network.

2. The method of claim 1, wherein the first communication network is a hardwired communication network.

3. The method of claim 1, wherein the second communication network is a wireless communication network.

4. The method of claim 1, wherein the first data packet comprises authentication data pertaining to the first safety device, wherein the authentication data is indicative of a compatibility of the first device with the first or second communication networks, and wherein the method further comprises commissioning, by the controller, the first safety device responsive to receipt of a positive authentication of the first safety device.

5. The method of claim 1, wherein the first data packet comprises network configuration data pertaining to the second communication network.

6. The method of claim 1, wherein the first data packet is received, by the controller, from an electronic device associated with a user.

7. The method of claim 1, wherein the log of operations for the first and second safety devices comprises any one or a combination of an identity, a state of charge of a battery, a log of detection of fire hazards of the respective safety device.

8. The method of claim 1, wherein the second data packets are configured to be generated, by the controller, at predefined instances of time.

9. The method of claim 1, further comprising providing an electronic device communicably coupled to the controller, the electronic device comprising an interface configured for exchange of data between the controller and a user of the electronic device.

10. A system for commissioning safety devices, the system comprising:
   a first safety device and a second safety device, each configured to generate a signal responsive to detection of a hazard, wherein the first and second safety devices are communicably coupled to each other via first and second communication networks; and
   a controller communicably coupled to the first and second safety devices, the controller comprising a processor and a memory communicably coupled to the processor, the controller configured to:
   receive, at the first safety device, a first data packet comprising attributes pertaining to commissioning of the first safety device, wherein the commissioning of the first safety device is indicative of a positive coupling of the first safety device with one or both of the first and second communication networks; and
   transmit, the first data packet to the second safety device through the first communication network,
   wherein the second safety device receives the first data packet to enable respective commissioning of the second safety device;

wherein the controller is further configured to:
   generate a second data packet comprising a log of operations for the first and second safety devices; and
   transmit the second data packet to an external storage device communicably coupled to the controller, via the second communication network.

11. The system of claim 10, wherein the first communication network is a hardwired communication network.

12. The system of claim 10, wherein the second communication network is a wireless communication network.

13. The system of claim 10, wherein the first data packet comprises authentication data pertaining to the first safety device, wherein the authentication data is indicative of a compatibility of the first safety device with the first or second communication networks, and wherein the controller is configured to commission the first safety device responsive to receipt of a positive authentication of the first safety device.

14. The system of claim 10, wherein the first data packet comprises network configuration data pertaining to the second communication network.

15. The system of claim 10, wherein the first data packet is received, by the controller, from an electronic device associated with a user.

16. The system of claim 10, wherein the log of operations for the first and second safety devices comprises one or a combination of an identity, a state of charge of a battery, a log of detection of fire hazards of the respective safety device.

17. The system of claim 10, wherein the controller is configured to generate the second data packets at predefined instances of time.

18. The system of claim 10, further comprising an electronic device communicably coupled to the controller, the electronic device comprising an interface configured for exchange of data between the controller and a user of the electronic device.

* * * * *